W. V. RICHNER.
CONVERTIBLE VEHICLE BODY.
APPLICATION FILED MAR. 26, 1918.
1,304,202.
Patented May 20, 1919.
2 SHEETS—SHEET 2.
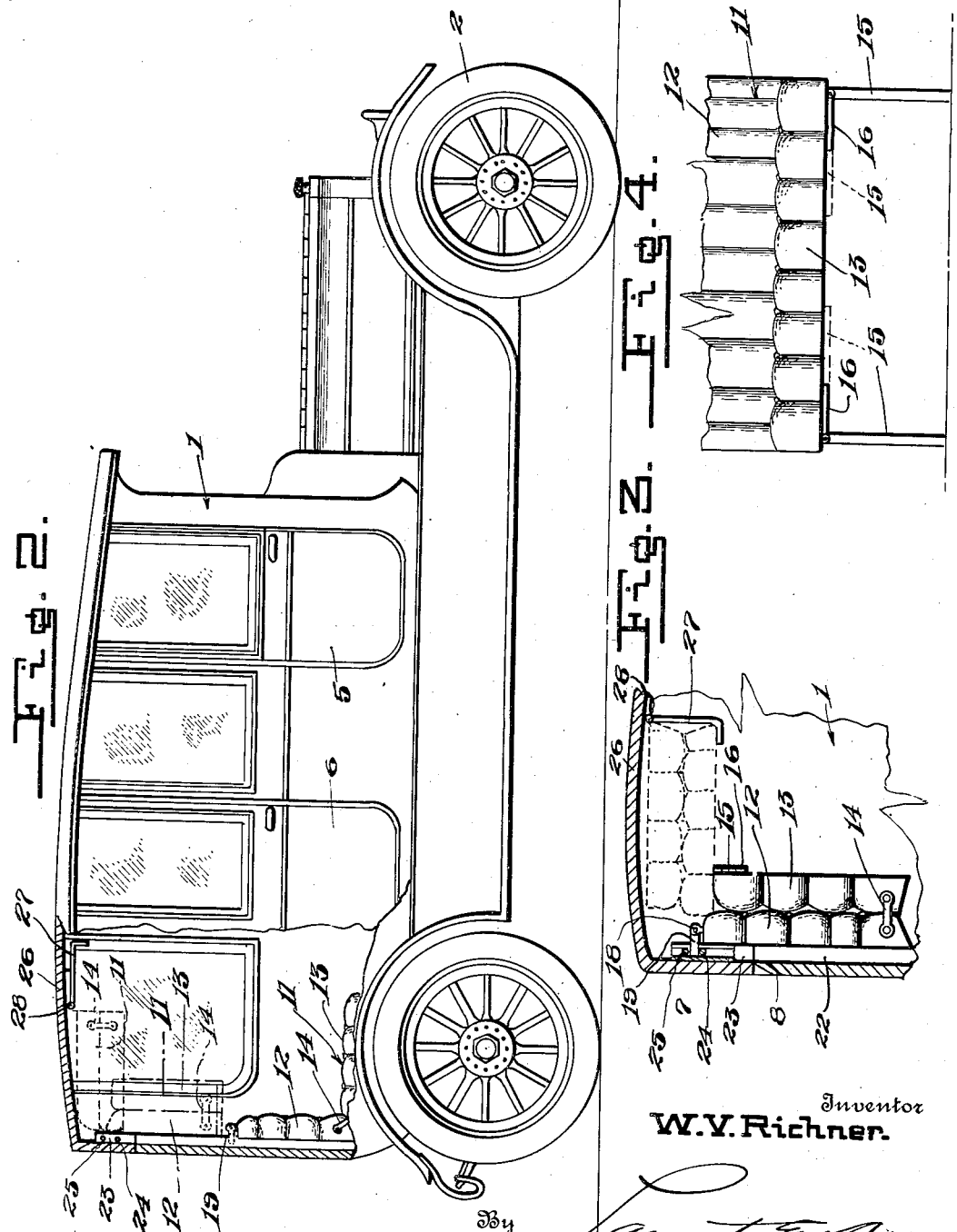
Inventor
W. V. Richner.
By Lancaster and Allwine
Attorneys

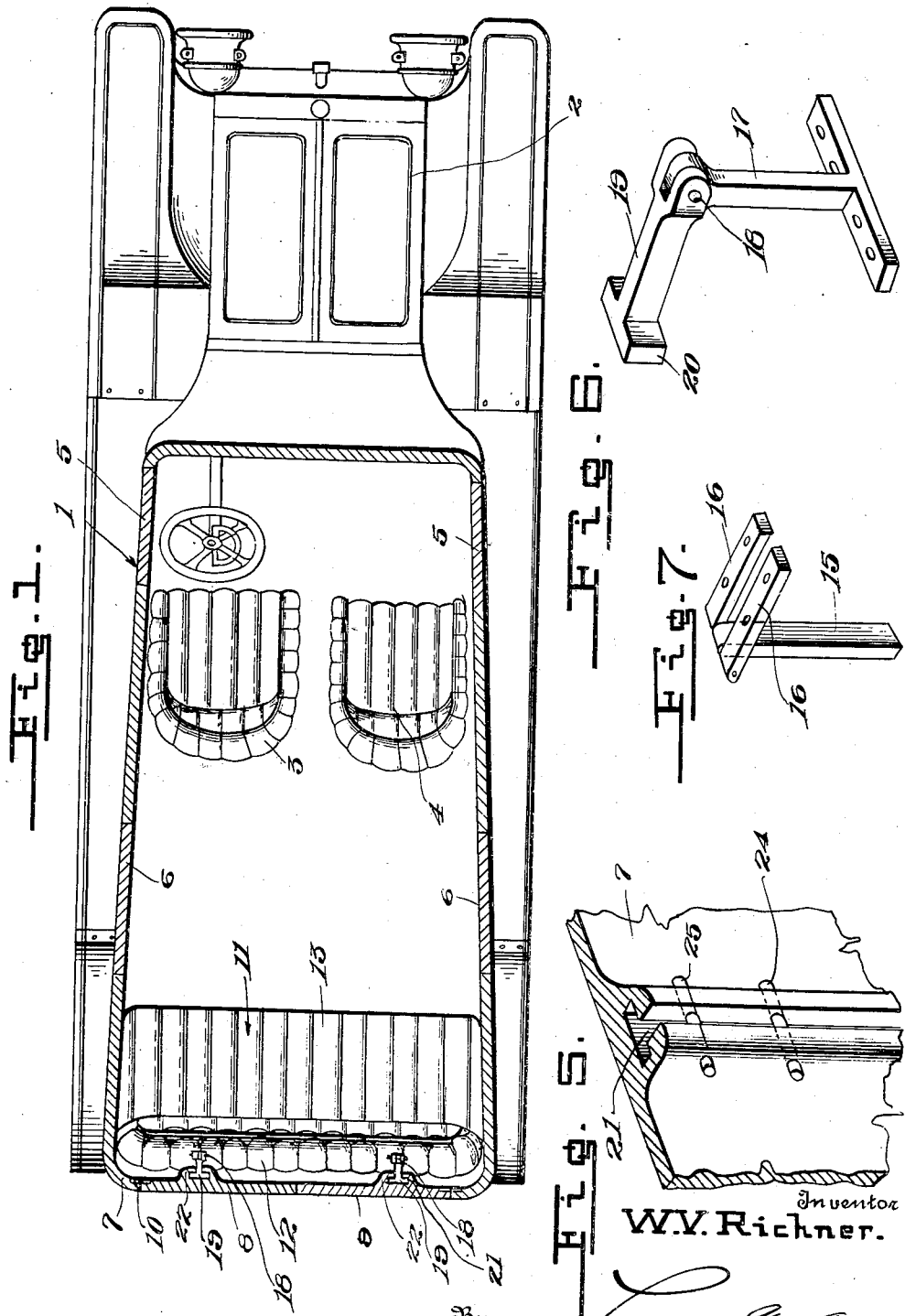
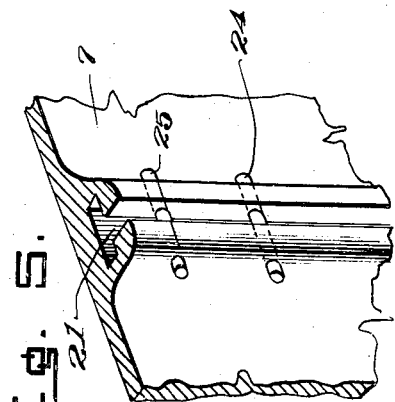

UNITED STATES PATENT OFFICE.

WILLIAM V. RICHNER, OF CHAMPAIGN, ILLINOIS.

CONVERTIBLE VEHICLE-BODY.

1,304,202.

Specification of Letters Patent.   Patented May 20, 1919.

Application filed March 26, 1918. Serial No. 224,769.

*To all whom it may concern:*

Be it known that I, WILLIAM V. RICHNER, a citizen of the United States, and a resident of Champaign, in the county of Champaign and State of Illinois, have invented a certain new and useful Improvement in Convertible Vehicle-Bodies, of which the following is a specification.

This invention relates to vehicle bodies, of the "sedan" type, and the primary object of the invention is to provide a vehicle body, in which the rear passenger carrying seat may be folded into a compact position and suspended beneath the top of the body to permit the interior of the body to be used as a parcel carrier or delivery car, when desired.

Another object of this invention is to provide a vehicle body as specified, in which the rear passenger carrying seat thereof has the seat portion hingedly connected to the back portion so that the seat portion may be folded upwardly to lie in engagement with the back portion and further to provide means for adjustably connecting the back of the rear seat to the back of the vehicle body to permit the rear seat when in a folded position to be raised and swung outwardly in a horizontal position a short distance below the top of the body, and also to provide a pair of doors which form a portion of the back of the body and carry part of the seat guiding means whereby when the seat is in a lowered operative position, the doors will be held against accidental opening movement.

A further object of this invention is to construct said guiding means whereby the seat may be disconnected therefrom and completely removed from the interior of the body.

Other objects of the invention will appear in the following detailed description, taken in connection with the accompanying drawings forming a part of this specification, and in which drawings:

Figure 1 is a horizontal section through the vehicle body showing the rear seat in an operative position.

Fig. 2 is a side elevation of the vehicle having a portion of one side thereof broken away to expose the interior, and showing the seat in its suspended position in dotted lines.

Fig. 3 is a fragmentary sectional view through the rear upper corner of the body illustrating the seat in its upper most position and ready to be moved outwardly to its horizontal position in close proximity to the top of the body which position is indicated in dotted lines.

Fig. 4 is a fragmentary front elevation of the seat in an extended position showing the supporting legs therefor.

Fig. 5 is a detail perspective view of a fragment of the seat guiding means.

Fig. 6 is a detail perspective view of the means for connecting the back of the rear seat to the guides which are carried by the inner surface of the rear wall or side of the body.

Fig. 7 is a detail perspective view of one of the seat supporting legs.

Referring more particularly to the drawings, 1 designates the vehicle body as an entirety, which is of the usual type commonly known as "sedan" and is carried by any suitable or ordinary type of chassis 2. The body 1 has positioned therein two separate individal front seats 3 and 4, the seat 3 being provided for the driver, and positioned in close proximity to the controlling mechanism of the vehicle. If it is so desired, the seat 4 may be detachably connected to the body for removal therefrom.

The body 1 is provided with the usual side doors 5 and 6, and the back 7 of the body has a portion thereof composed of doors 8 and 9 which are hingedly connected by countersunk hinges 10 to the body 1.

The rear seat 11 is composed of a back 12 and a seat portion 13 which is connected to the back 12 by links 14 which are pivotally connected to the back 12 and the seat 13 so as to permit the seat to be folded upwardly and have its normally upper surface engage the forward surface of the back 12 as clearly shown in Fig. 3 of the drawings.

The seat 13 has a pair of supporting legs 15 attached thereto by means of a pair of spaced plates 16 to which plates the legs 15 are pivoted, to allow the legs to be folded as indicated in dotted lines in Fig. 4 of the drawings when the seat is in a folded position.

The back 12 of the seat has a pair of inverted T-members 17 attached thereto, the upper ends of which are pivotally connected as at 18 to T-bars 19 the transverse heads of which ride in slots 21 formed in the guide structures 22. The guide structures 22 are attached to or formed upon the inner surfaces of the doors 8 and 9 and they have portions 23 which are attached to the inner surface of the back or rear wall 7 of the body 1 upwardly of the upper edges of the doors.

When it is desired to use the vehicle body 1 as a delivery car, or for carrying parcels, the seat portion 13 of the rear seat is folded upwardly against the outer surface of the back 12 of the rear seat and the pins 24, one of which extends through each of the guides 22 are withdrawn. After the pins 24 are withdrawn the folded rear seat is moved upwardly until the transverse heads 20 of the T-bars 19 engage beneath the pins 25, one of which extends through each of the guides. The rear seat structure is then swung outwardly and upwardly upon the pivotal connections 18, to lie in a horizontal position in close proximity to the inner surface of the top 26 of the vehicle body 1 as shown in dotted lines in Figs. 2 and 3 of the drawings. The pins 24 are inserted through the guides beneath the T-bars 19 to prevent the rear edges of the seat from moving downwardly and a suitable support 27 is pivotally connected as shown at 28 to the top 26 and engages the forward edge of the rear seat to prevent downward movement of this end.

When the rear seat 11 is in its operative or unfolded position, the engagement of the T-bars 19 in the guides 22 carried by the doors 8 and 9 will lock these doors against opening movement, but when the seat is raised and folded in close proximity to the top of the body, the doors may be readily opened to permit the loading of the body.

If it is desired to completely remove the rear seat structure 11 from the interior of the body 1, the upper pins 25 are removed, and the T-bars 19 are moved out of the upper open end of the slots 21 of the guides 22.

Having thus fully described the invention what is claimed is:

1. In a vehicle body having a top, a removable seat comprising a back and a seat portion hingedly connected for permitting the seat portion to be swung upwardly into engagement with the front surface of the seat back, means connecting said seat back to the vehicle body to permit the seat to be moved upwardly and swung into a horizontal position directly beneath said top.

2. In a vehicle body having a top, a removable seat comprising a back and a seat portion hingedly connected for permitting the seat portion to be swung upwardly into engagement with the front surface of the seat back, means connecting said seat back to the vehicle body to permit the seat to be moved upwardly and swing into a horizontal position directly beneath said top, and removable means to prevent the disconnection of the seat and the body.

3. In a vehicle body of the sedan type having a top and rear wall, a pair of doors forming a portion of the rear wall, a rear seat, means adjustably connecting said rear seat to said doors to hold the doors closed when the seat is in an operative position.

4. A vehicle body of the sedan type having a top and rear wall, a pair of doors forming a portion of the rear wall, a rear seat, means adjustably connecting said rear seat to said doors to hold the doors closed when the seat is in an operative position, said seat adapted to be moved upwardly to permit the doors to be opened, and means for suspending said seat in close proximity to the top of the body.

5. An inclosed vehicle body having a top and a rear wall, a pair of doors forming a portion of said rear wall, a rear seat comprising a back and a seat portion hingedly connected to permit the seat portion to be swung upwardly into engagement with the front surface of the back, means adjustably connecting said rear seat to said doors to hold the doors closed when the seat is in an operative position, said seat adapted to be moved upwardly when in a folded position to permit said doors to be opened, and means for suspending said seat in close proximity to the top of the said body.

6. An inclosed vehicle body having a top and a rear wall, a pair of doors forming a portion of said rear wall, a rear seat comprising a back and a seat portion hingedly connected to permit the seat portion to be swung upwardly into engagement with the front surface of the back, means adjustably connecting said rear seat to said doors to hold the doors closed when the seat is in an operative position, said seat adapted to be moved upwardly when in a folded position to permit said doors to be opened, and means for suspending said seat in close proximity to the top of the said body, and removable means for preventing accidental disconnection between said seat and a means connecting the seat and said doors.

7. In a vehicle body of the inclosed type having a top and rear wall, a pair of doors forming a portion of the said rear wall, a rear seat comprising a back and a seat portion hingedly connected to permit the seat portion to be folded upwardly into engagement with the back, guides carried by said doors and the inner surface of the rear wall of the body, means carried by the back of said rear seat and engaged in said guide for guiding upward movement of the rear seat, said seat adapted to be moved into a horizontal position when it reaches the end of its upper movement, and means carried by said guide for preventing accidental downward movement of the rearmost end of the said seat when in its uppermost horizontal position.

8. In a vehicle body of the inclosed type having a top and rear wall, a pair of doors forming a portion of the said rear wall, a rear seat comprising a back and a seat portion hingedly connected to permit the seat portion to be folded upwardly into engagement with the back, guides carried by said doors and the inner surface of the rear wall of the body, means carried by the back of said rear seat and engaged in said guide for guiding upward movement of the rear seat, said seat adapted to be moved into a horizontal position when it reaches the end of its upper movement, and means carried by said guide for preventing accidental downward movement of the rearmost end of the said seat when in its uppermost horizontal position, said last named means being removable to permit disconnection between said seat and said guide.

9. In a combined pleasure and delivery vehicle, the combination, of a body including a top, a seat within said body, means for supporting the seat near said top when said vehicle is to be employed for delivery purposes and means for guiding vertical movement of the seat.

10. In a combined pleasure and delivery vehicle, the combination, of a body including a top and the usual entrance doors, a seat within said body, means for supporting said seat in an inoperative position when said vehicle is to be employed for delivery purposes, said body having a parcel receiving door remote from the usual doors, and means for connecting said seat to said parcel receiving door to lock the latter closed when said seat is in an operative position.

11. In a vehicle body, a top, a wall, a door forming a part of said wall, a seat, alining guideways carried by the door and wall, means carried by the seat and engaging in said guideways to connect the seat to the door or wall, said seat holding said door against movement when connected thereto, said last named means adapted to be moved into the wall carried guideways to permit opening of the door.

12. In a vehicle body, a top, a foldable seat, means for holding the seat suspended from said top when in a folded position and means for guiding vertical movement of the seat.

13. In a vehicle body, a top, a wall, a door forming a part of said wall, a foldable seat, means adjustably connecting said seat, when in an operative position, to said door to hold said door against movement, and means for holding said seat suspended from said top and in a folded position to permit opening of the door.

14. In a vehicle body, a top, a wall, a door forming a part of said wall, a foldable seat, alining guideways carried by the door and wall, means carried by the seat and engaging in said guideways to connect the seat to the door or wall, said seat holding said door against movement when connected thereto, said last named means adapted to be moved into the wall carried guideways to permit the opening of the door, and means for holding the seat suspended from said top and in a folded position.

15. In a vehicle body, a wall, a door forming a part of said wall, a foldable seat, means connecting said seat when in an operative position to said door to hold said door against movement, and supporting legs hingedly connected to the under surface of the free edge of the seat portion of said foldable seat.

16. In a vehicle body, having a top, a removable seat comprising a back and seat portion hingedly connected for permitting the seat portion to be swung upwardly into engagement with the front surface of the seat back, means connecting said seat back to the vehicle body to permit the seat to be moved upwardly and swung into a horizontal position directly beneath said top, and a plurality of supporting legs hingedly connected to the forward under surface of said seat portion.

17. In a vehicle body of the sedan type having a top and rear wall, a pair of doors forming a portion of said rear wall, a rear seat, means adjustably connecting said rear seat to said doors to hold the doors closed when the seat is in an operative position, and means carried by said top for supporting said seat in an inoperative position.

18. In a vehicle body, a top, a removable seat comprising a back and a seat portion hingedly connected for permitting the seat portion to be swung upwardly into engagement with the front surface of the seat back, means connecting said seat back to the vehicle body to permit the seat to be moved upwardly and swung into a horizontal position, and means for suspending said seat when folded in close proximity to the top of said body.

19. In a combined pleasure and delivery vehicle, the combination, of a body including a top, a seat within said body, means for supporting the seat near said top when said vehicle is used for delivery purposes, a guide carried by said body, and means carried by and riding in said guide for guiding the vertical movement of the seat.

20. In a combined pleasure and delivery vehicle, the combination, of a body including a top, a seat within said body, means for supporting the seat near the top when said vehicle is used for delivery purposes, a guide carried by the body, means carried by the seat and riding in said guide for guiding vertical movement of the seat, and a pin adapted for insertion through said guide beneath said last named means to prevent accidental downward movement of said last named means within the guide.

21. In a combined pleasure and delivery vehicle, the combination, of a body including a top, a seat within said body, means for supporting the seat near the top of the body when said vehicle is used for delivery purposes, a guide carried by the body, means carried by the seat and riding in said guide for guiding vertical movement of the seat, means movably carried by said guide to limit the upward movement of the seat carried means in said guide, said movable means adapted to be disconnected from the guide to permit disconnection of the seat and guide.

22. In a combination pleasure and delivery vehicle, the combination, of a body including a top, a seat within said body, means for supporting the seat near the top when said vehicle is used for delivery purposes, a guide carried by the body, means carried by the seat and riding in said guide for guiding vertical movement of the seat, a pin adapted for insertion through said guide beneath said last named means to prevent accidental movement of said last named means within the guide, and means removably carried by said guide to limit the upward movement of the seat carried means in said guide, said limiting means adapted to be disconnected from the guide to permit disconnection of the seat and guide.

WILLIAM V. RICHNER.